US011548080B2

(12) United States Patent
Sorkin

(10) Patent No.: US 11,548,080 B2
(45) Date of Patent: Jan. 10, 2023

(54) SHEARING APPARATUS AND PROCESS FOR POST TENSIONING TENDON

(71) Applicant: Felix Sorkin, Stafford, TX (US)

(72) Inventor: Felix Sorkin, Stafford, TX (US)

( * ) Notice: Subject to any disclaimer, the term of this patent is extended or adjusted under 35 U.S.C. 154(b) by 0 days.

(21) Appl. No.: 17/218,822

(22) Filed: Mar. 31, 2021

(65) Prior Publication Data
US 2021/0316378 A1 Oct. 14, 2021

Related U.S. Application Data

(60) Provisional application No. 63/007,209, filed on Apr. 8, 2020.

(51) Int. Cl.
*B23D 15/04* (2006.01)
*B23D 33/02* (2006.01)
*B23D 15/14* (2006.01)
*E04C 5/12* (2006.01)

(52) U.S. Cl.
CPC ............. *B23D 15/04* (2013.01); *B23D 15/14* (2013.01); *B23D 33/02* (2013.01); *E04C 5/122* (2013.01)

(58) Field of Classification Search
CPC ........ B23D 15/04; B23D 15/14; B23D 33/02; B23D 23/04; E04C 5/122; E04C 5/12; E04G 21/12; E04G 21/121; B21F 11/00; E04B 1/66; Y10T 83/04; Y10T 83/416; Y10T 83/9447; B26D 3/169; H02G 1/127; H02G 1/1256
USPC ............... 83/13, 199, 196, 200, 947; 254/29
See application file for complete search history.

(56) References Cited

U.S. PATENT DOCUMENTS

| 2,269,914 | A | * | 1/1942 | Parker | B23D 33/00 83/639.1 |
| 3,128,820 | A | * | 4/1964 | Hoyt et al. | H05K 13/023 72/335 |
| 3,491,431 | A | | 1/1970 | Pewitt | |
| 4,051,749 | A | * | 10/1977 | Bell | H02G 1/1256 81/9.51 |
| 5,042,337 | A | | 8/1991 | Rodriquez | |
| 5,058,469 | A | | 10/1991 | Rodriguez | |
| 6,032,366 | A | * | 3/2000 | Tominaga | H02G 1/1212 30/90.1 |

(Continued)

FOREIGN PATENT DOCUMENTS

DE 1752917 A1 4/1971
EP 3391985 A1 10/2018
(Continued)

OTHER PUBLICATIONS

Office Action issued in European App. No. 21166907.2, dated Sep. 10, 2021 (19 pages).

(Continued)

*Primary Examiner* — Ghassem Alie
(74) *Attorney, Agent, or Firm* — Hunton Andrews Kurth LLP

(57) ABSTRACT

A table shear may include a clamp and a shearing mechanism, the shearing mechanism supported by the clamp. The shearing mechanism may include a fixed lower shear blade, a lower shear blade backup plate supporting the fixed lower shear blade, a moveable upper shear blade and a shear compression cylinder. The shear compression cylinder abuts the movable upper shear blade.

3 Claims, 9 Drawing Sheets

(56) References Cited

U.S. PATENT DOCUMENTS

| | | | |
|---|---|---|---|
| 6,243,947 B1 * | 6/2001 | Fujita | H02G 1/1256 29/33 F |
| 6,840,146 B2 * | 1/2005 | Gosis | B23D 23/04 83/199 |
| 8,015,774 B1 * | 9/2011 | Sorkin | E04C 5/122 52/745.21 |
| 11,159,002 B2 * | 10/2021 | Calic | H02G 1/1256 |
| 2002/0174759 A1 * | 11/2002 | Bernardelle | H02G 1/127 83/947 |
| 2015/0052761 A1 | 2/2015 | Jager | |
| 2019/0308256 A1 * | 10/2019 | Farley, Jr. | B23D 33/08 |

FOREIGN PATENT DOCUMENTS

| | | |
|---|---|---|
| JP | S54141477 A | 11/1979 |
| KR | 20170109410 A | 9/2017 |

OTHER PUBLICATIONS

Https://precision-hayes.com/pdfs/16-030000414_strand_shearing. pdf ; "PS-Series, PocketShear"; (online brochure available at least as early as Jan. 29, 2020); 2 pages.

* cited by examiner

SHEARING APPARATUS AND PROCESS FOR POST TENSIONING TENDON

CROSS-REFERENCE TO RELATED APPLICATIONS

This application is a nonprovisional application that claims priority from U.S. provisional application No. 63/007,209, filed Apr. 8, 2020, which is hereby incorporated by reference.

TECHNICAL FIELD/FIELD OF THE DISCLOSURE

The present disclosure relates generally to post-tensioned, pre-stressed concrete construction. The present disclosure relates specifically to an apparatus and process for shearing a tendon for use therein.

BACKGROUND OF THE DISCLOSURE

Many structures are built using concrete, including, for instance, buildings, parking structures, apartments, condominiums, hotels, mixed-use buildings, casinos, hospitals, medical buildings, government buildings, research/academic institutions, industrial buildings, malls, bridges, pavement, tanks, reservoirs, silos, foundations, sports courts, and other structures.

Pre-stressed concrete is structural concrete in which internal stresses are introduced to reduce potential tensile stresses in the concrete resulting from applied loads. This can be accomplished by two methods—post-tensioned pre-stressing and pre-tensioned pre-stressing. When post tensioning concrete, the pre-stressing assembly is tensioned after the concrete has attained a specified strength. The pre-stressing assembly, commonly known as a tendon, may include for example and without limitation, anchorages, one or more strands, and sheathes or ducts. The strand is tensioned between anchors which are embedded in the concrete once the concrete has hardened. The strand may be formed from a metal or composite or any suitable material exhibiting tensile strength which can be elongated, including, for example and without limitation, reinforcing steel, single wire cable, or multi-wire cable. The strand is typically fixedly coupled to a fixed anchorage positioned at one end of the tendon, the so-called "fixed end", and is adapted to be stressed at the other anchor, the "stressing end" of the tendon. The strand is generally held to each anchor by one or more wedges. Typically, anchors include a tapered recess which, when the strand is placed under tension, causes the wedges to further engage the strand. Wedges are typically made of metal.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
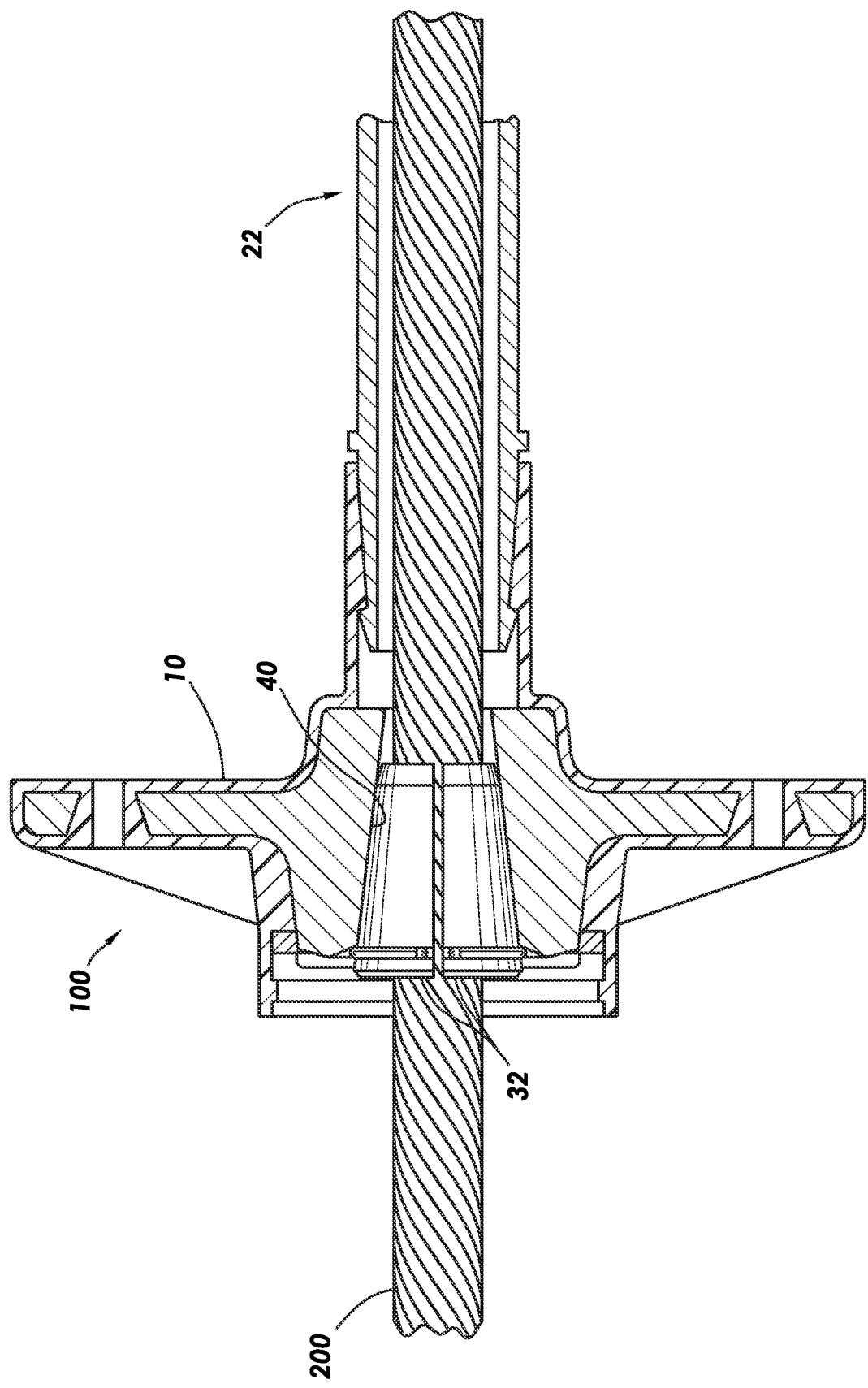
FIG. 1 is a cross-sectional view of an anchor according to an embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts anchor 100 for use in post tensioning concrete. Anchor 100 is adapted to receive and couple to strand 200 of tendon 22. Strand 200 may be, for example and without limitation, mono-wire cable, or multi-wire cable. For the purposes of this disclosure, the axis parallel with the length of strand 200 will be referred to as the longitudinal axis of strand 200. Anchor 100 may include anchor body 10 adapted to retain the position of anchor 100 when positioned in formed concrete.

Anchor 100 may couple to strand 200 by the use of one or more wedges 32. Wedges 32 may be substantially wedge shaped and adapted to fit into tapered portion 40 formed in anchor body 10. Tension on strand 200 may cause wedges 32 to move into tapered recess 40, applying a gripping force on strand 200.

Figure 2:
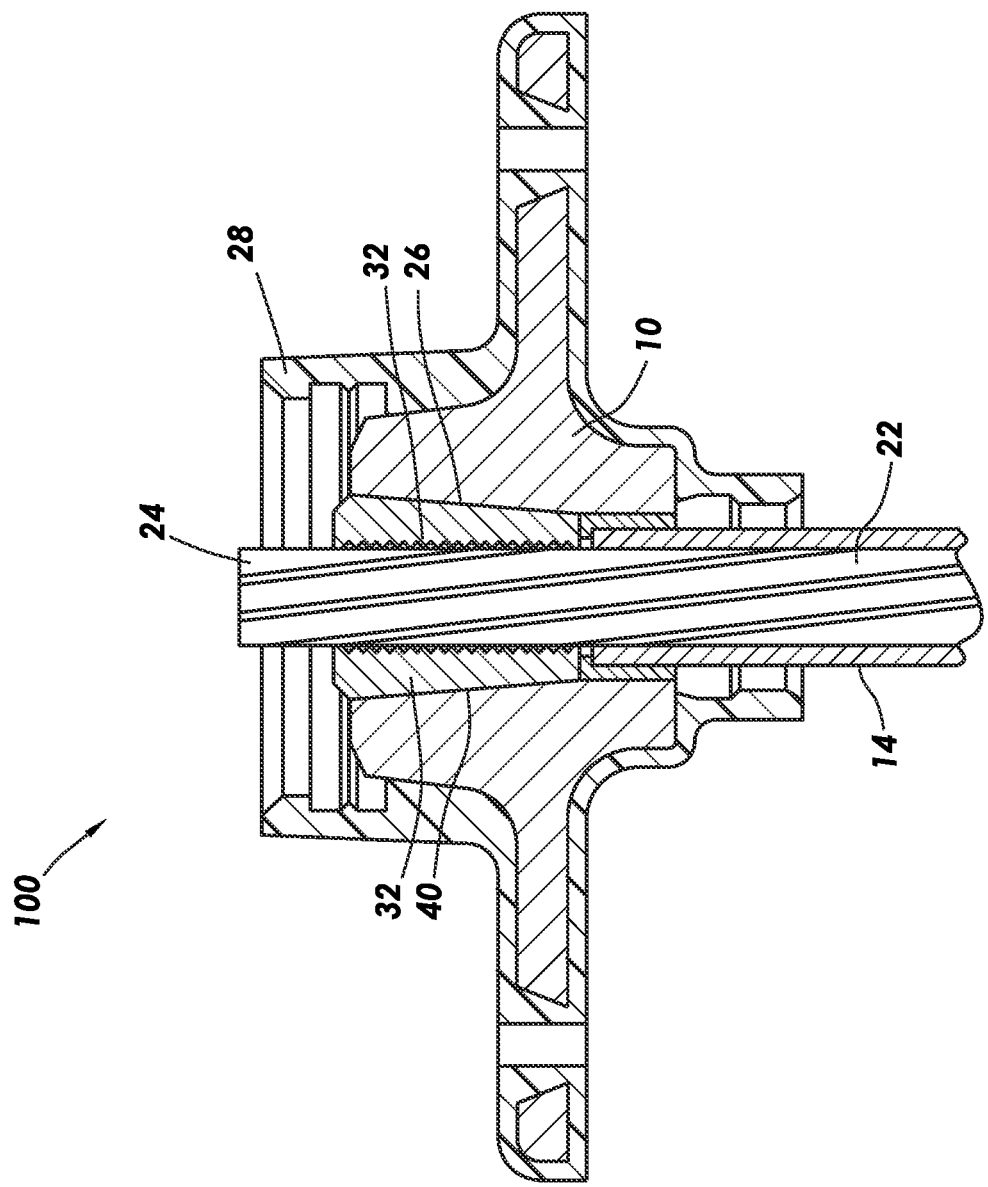
FIG. 2 is a cross-sectional view of an anchor according to an embodiment of the present disclosure.

FIG. 2 depicts anchor 100 having end 24 of strand 200 cut flush or approximately flush with anchor body 10. In certain embodiments, cutting strand 200 is a two-step process, i.e., pushing strand 200 along the longitudinal axis of strand 200 and then cutting any excess strand 200. It is desirable to cut end of strand 200 to be as clean and straight as possible. Dust from cutting strand 200 with a saw, for example, and uneven parts of end 24 may result in uneven placement of wedges 32, pollutants such as dust between strand 200 and wedges 32 and between wedges 32 and anchor body 10, and bunching strand 200 as placed in anchor body 10.

Figure 3:
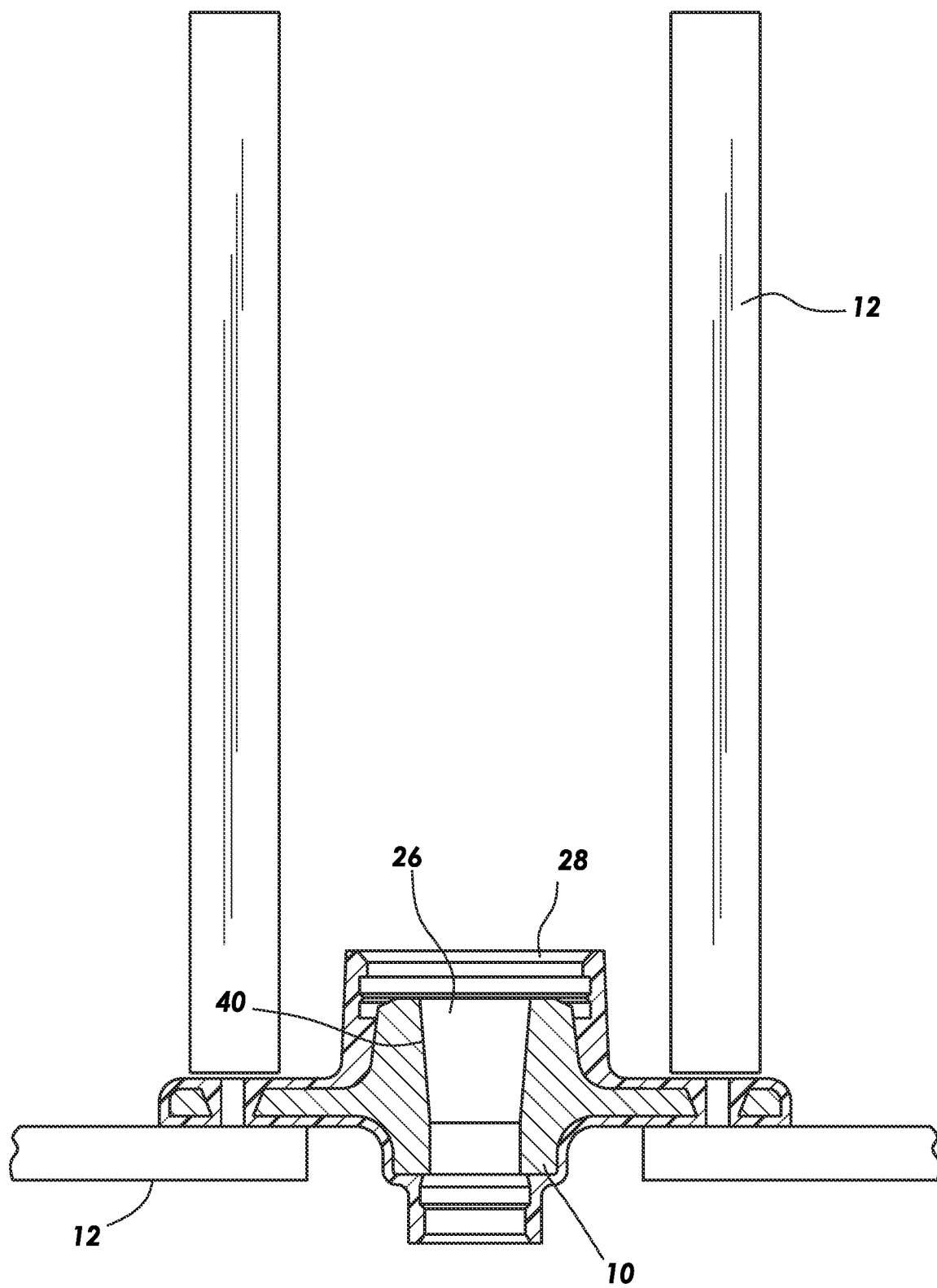
FIG. 3 is a cross-sectional view of an anchor positioned in a holding fixture.

In certain embodiments of the present disclosure, a table shear may be used to cut strand 200. FIG. 3 depicts a cross-sectional view of anchor body 10 fixed in holding fixture 12. Holding fixture 12 holds anchor body 10 stationary.

Figure 4:
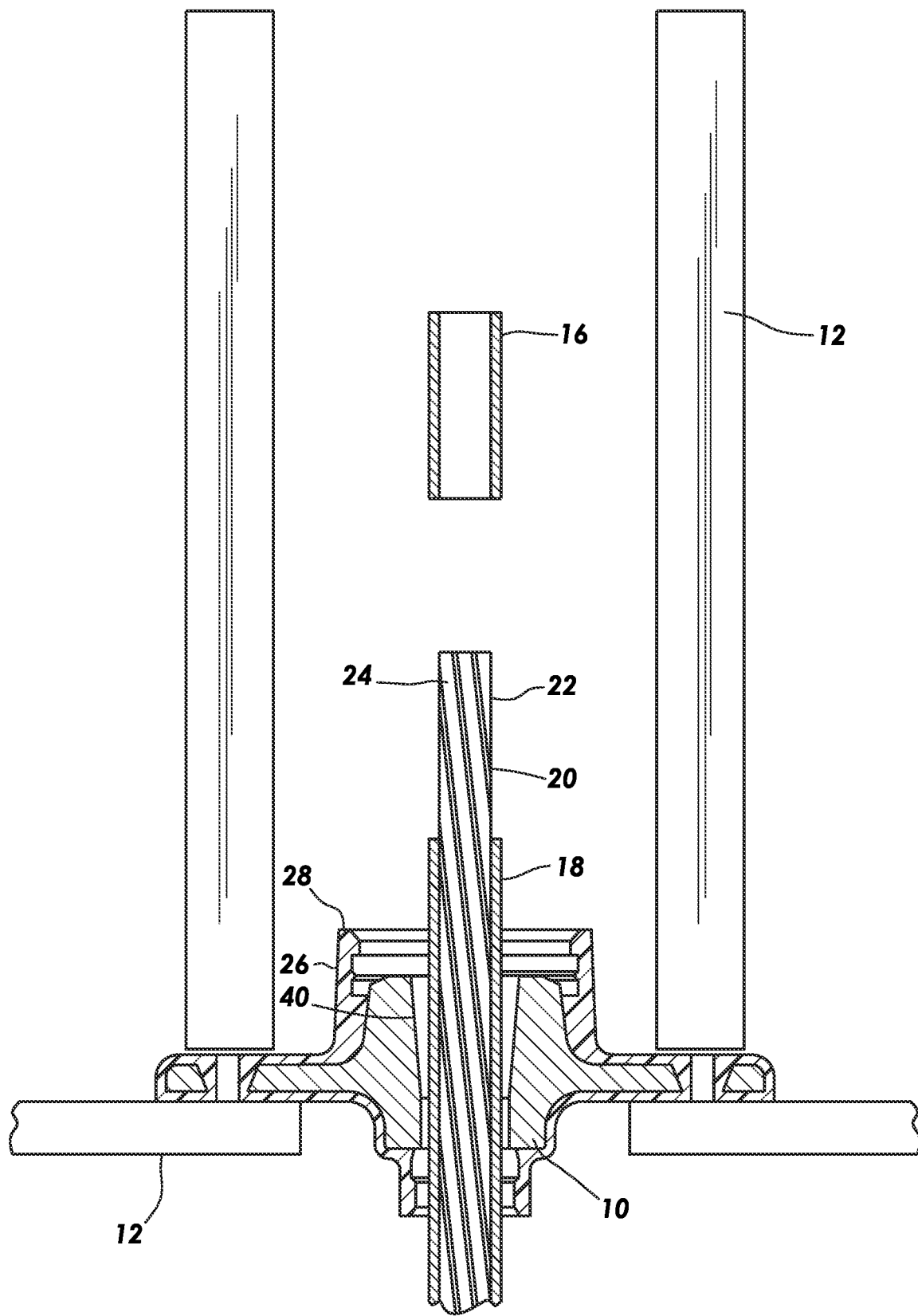
FIG. 4 is a cross-sectional view of an anchor positioned in a holding fixture.

Following fixing anchor body 10 in holding fixture 12, tendon 22 may be inserted into anchor body 10. FIG. 4 depicts a cross-sectional view of anchor body 10 having tendon 22 inserted therein. Portion 16 of sheathing 14 is removed from end 24 of tendon 22 so as to create unsheathed portion 20 and sheathed portion 18 of tendon 22.

Portion 16 may be discarded. Sheathed portion 18 and unsheathed portion 20 extend outwardly of end 28 of anchor body 10.

Figure 5:
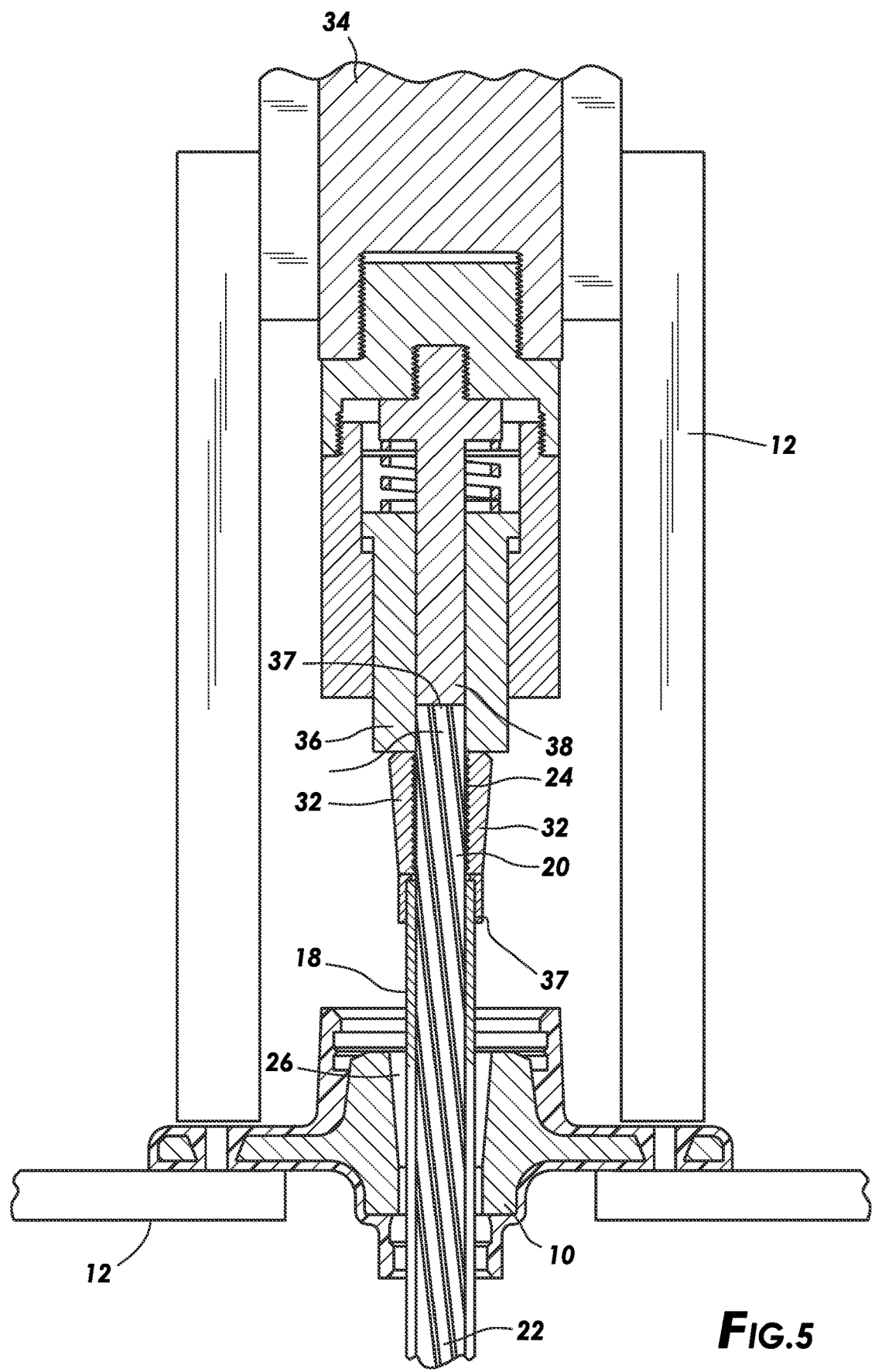
FIG. 5 is a cross-sectional view of an anchor and tendon with a compression mechanism positioned adjacent an end of the tendon.

Following removal of portion 16, compression mechanism 34 may be used. FIG. 5 depicts a cross-sectional view of the anchor body 10 and tendon 22, with wedges 32 placed on the tendon 22, and compression mechanism 34 positioned adjacent end 24 of tendon 22. Compression mechanism 34 may include cylindrical member 36 and plunger 38 positioned interior of cylindrical member 36. Cylindrical member 36 is mounted over plunger 38 such that plunger 38 may translate relative to cylindrical member 36. Interior 37 of compression mechanism 34 may be placed over end 24 of tendon 22, which is also end 21 of unsheathed portion 20. Wedges 32 may be placed around end 21 of unsheathed portion 20. Cylindrical member 36 of compression mechanism 34 abuts wedges 32. In certain embodiments, wedges 32 and cylindrical member 36 are made of a magnetic material, and wedges 32 are held around unsheathed portion 20 of tendon 22 by a magnetic force provided by cylindrical member 36 of compression mechanism 34.

Compression mechanism 34 may push against end 21 of unsheathed portion 20. End 21 of unsheathed portion 20 is positioned within interior 37 of cylindrical member 36. Cylindrical member 36 moves toward anchor body 10 until cylindrical member 36 is adjacent end 28 of anchor body 10 (as is shown in FIG. 5). Plunger 38 may push end 21 of unsheathed portion 20 toward bore 26 of anchor body 10.

Figure 6:
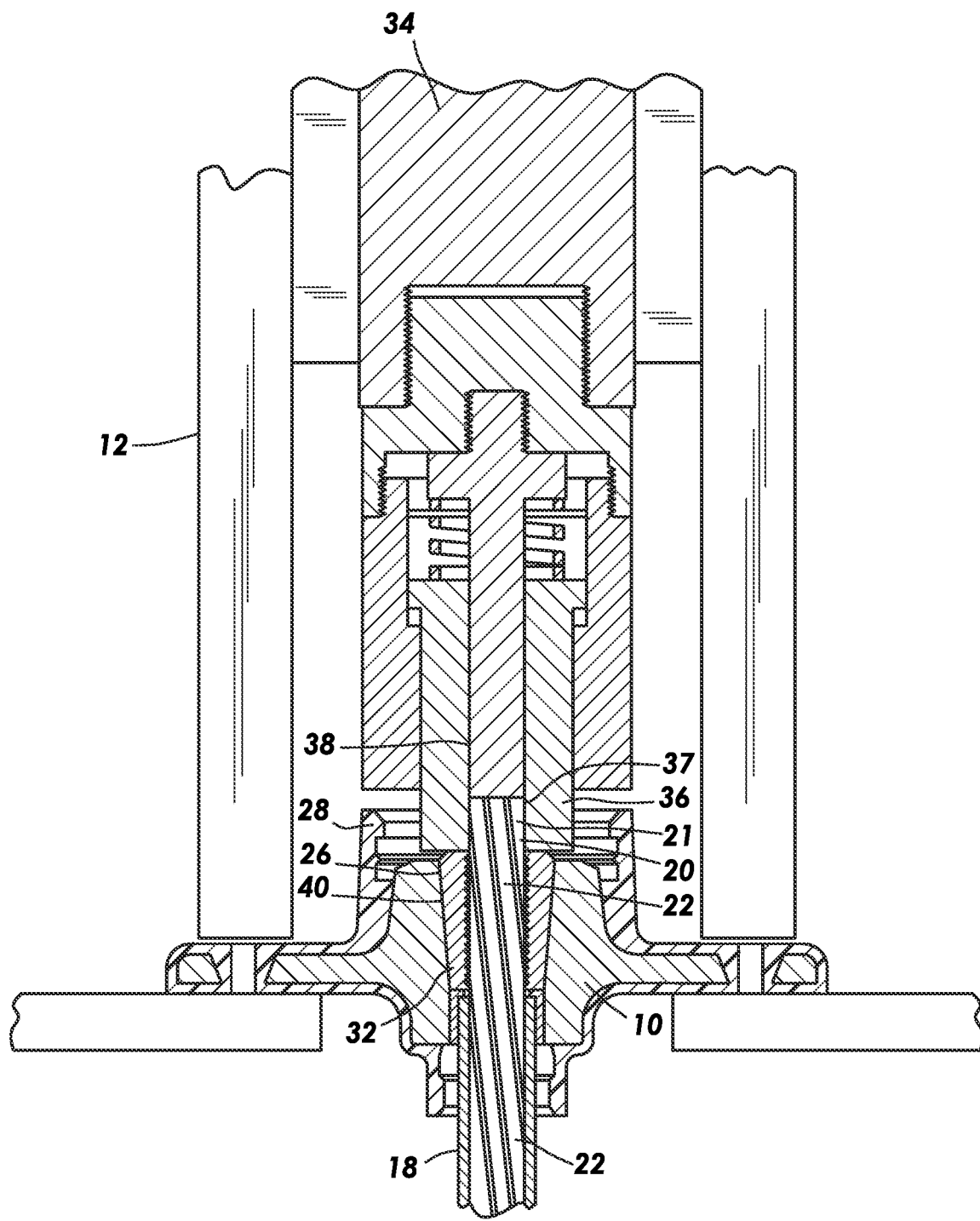
FIG. 6 is a cross-sectional view of an anchor, with a tendon and wedges moved into a bore of the anchor.

FIG. 6 depicts a cross-sectional view of fixed anchor body 10, with tendon 22 and wedges 32 moved into the bore 26 of the anchor body 10 by the compression mechanism 34. As shown in FIG. 6, cylindrical member 36 and plunger 38 of compression mechanism 34 are adjacent end 28 of anchor body 10. End 21 of the unsheathed portion 20 remains within interior 37 of the cylindrical member 36, but plunger 38 can be activated, if needed, to push end 21 of unsheathed portion 20 toward tapered portion 40 of bore 26 of anchor body 10. Wedges 32 affix tendon 22 within tapered portion 40 of bore 26 of anchor body 10.

Figure 7:
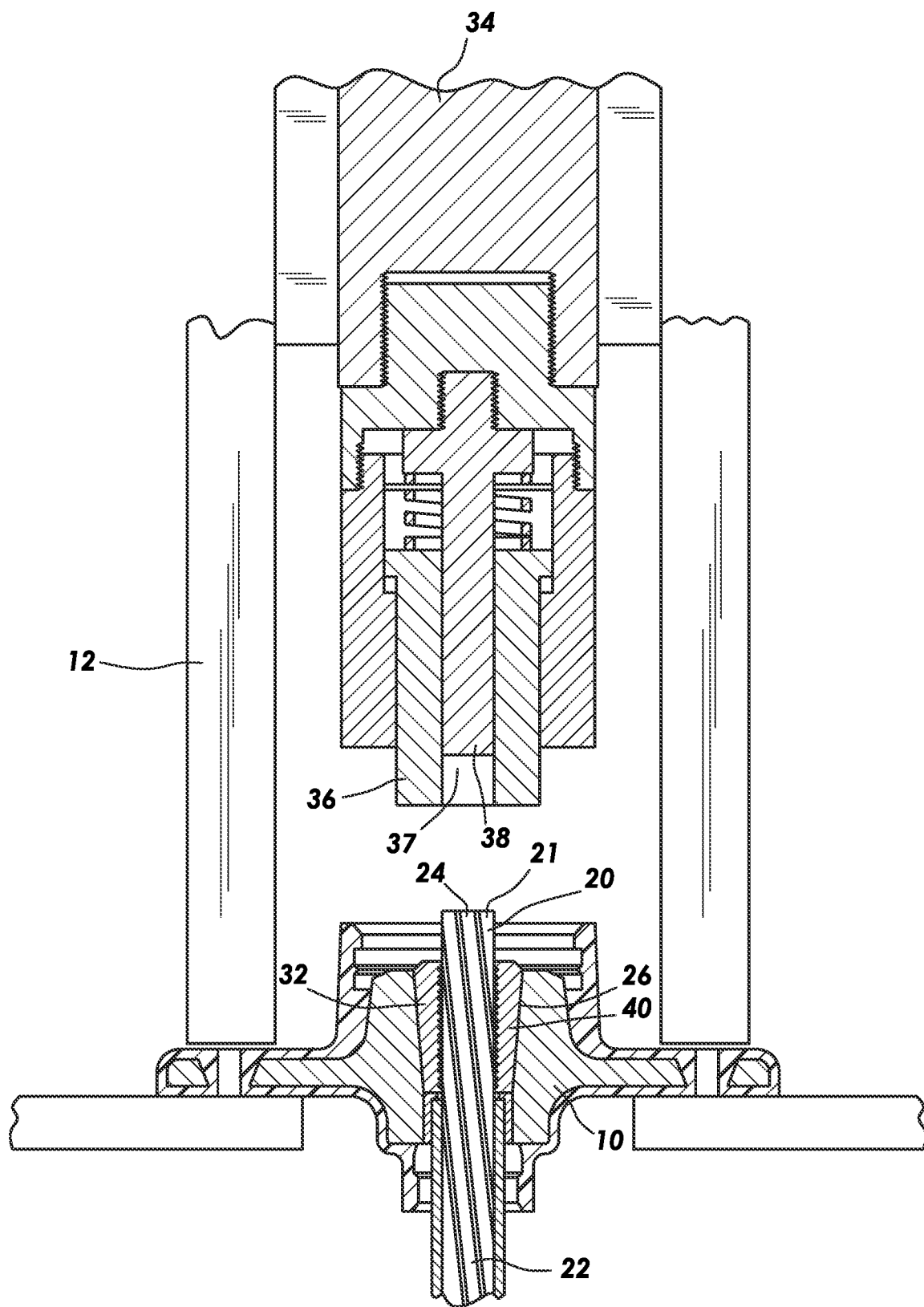
FIG. 7 is a cross-sectional view of the anchor with wedges affixed to the tendon and sheathing.
Figure 9:
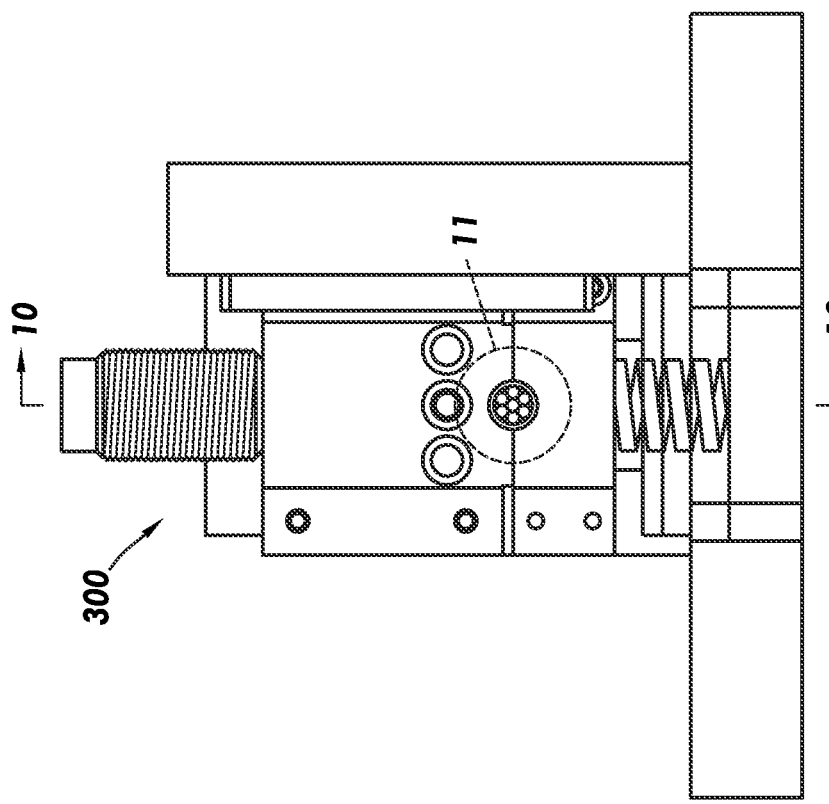
FIGS. 8-10 are views of a table shear consistent with at least embodiment of the present disclosure.
Figure 8:
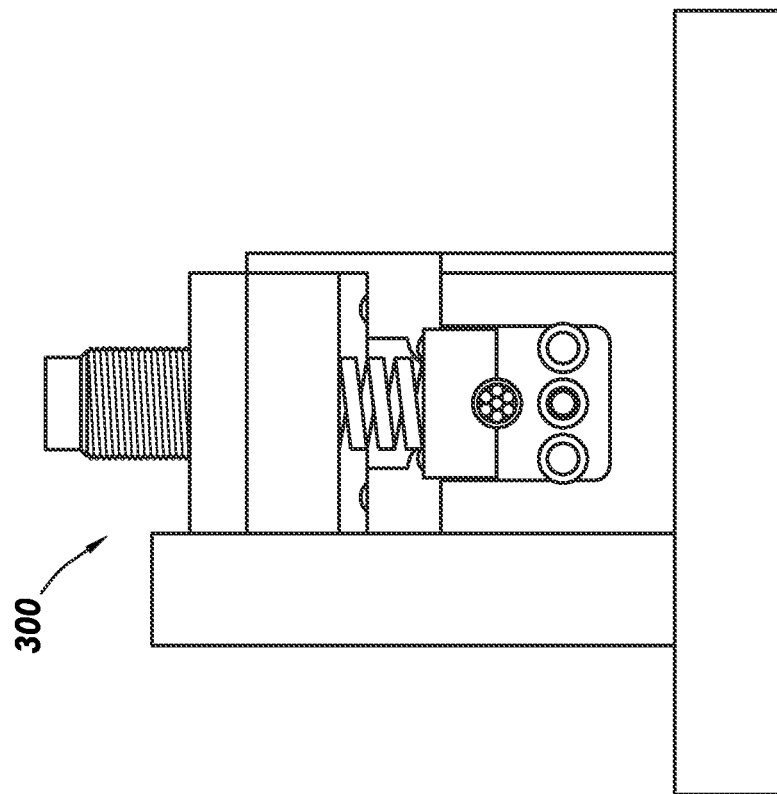

FIG. 7 depicts a cross-sectional view of anchor body 10 having wedges 32 affixed to the tendon 22 and sheathing 14, respectively, therein. Cylindrical member 36 and plunger 38 of compression mechanism 34 are shown retracted from end 21 of unsheathed portion 20 of tendon 22. Plunger 38 is shown retracted into interior 37 of cylindrical member 36. Wedges 32 are positioned within tapered portion 40 of bore 26 of anchor body 10.

Compression mechanism 34 is guided along the longitudinal axis of bore 26 of anchor body 10 by holding fixture 12. This guide prevents or retards multi-directional movement of compression mechanism 34 and anchor body 10.

Figure 11:
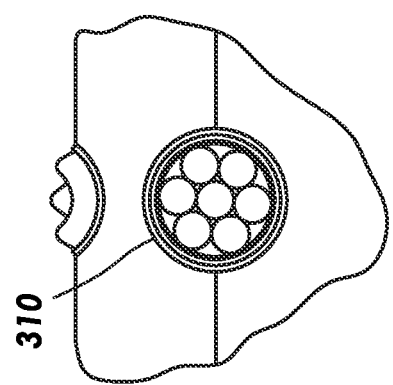
FIG. 11 depicts the shear hole of the table shear of FIGS. 8-10.
Figure 10:
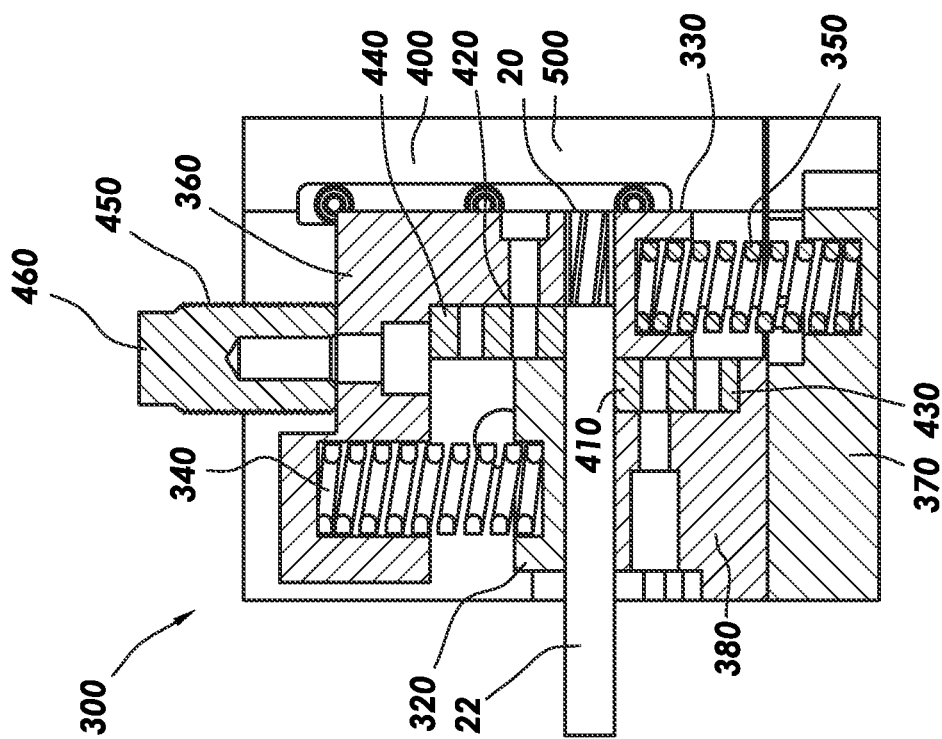

Following compression, sheathed portion 18 or unsheathed portion 20 of tendon 22 may be cut by table shear 300, as depicted in FIGS. 8-11. FIG. 10 is a cross-sectional view of table shear 300. As shown in FIG. 10, tendon 22 is inserted into table shear 300 through shear blade hole 310, as shown in FIG. 11. Tendon 22 is held in clamp 500. Clamp 500 may include upper spring hold down block 320 and lower shear support block 330 which abut tendon 22. Table shear 300 further includes upper biasing mechanism 340 and lower biasing mechanism 350, which may be, as shown in FIG. 11, springs. Upper biasing mechanism 340 holds upper spring hold down block 320 in place, while lower biasing mechanism 350 holds lower shear support block 330 in place. Upper biasing mechanism 340 is held in place by upper shear block 360, while lower biasing mechanism 350 is held in place by bottom plate 370. Tendon 22 rests against lower support block 380. Lower support block rests on bottom plate 370. Bottom plate 370 may also support lower shear blade back up plate 430.

Table shear includes shearing mechanism 400. Shearing mechanism 400 may include fixed lower shear blade 410 and movable upper shear blade 420. Fixed lower shear blade 410 may be supported by lower shear blade back up plate 430, while movable upper shear blade 420 may be supported by upper shear blade back up plate 440. Shear compression cylinder 450, which may include cylinder bushing 460, abuts upper shear blade back up plate 440.

In the operation of table shear 300, tendon 22 is inserted through shear blade hole 310 and held in place as described above. Shearing mechanism 400 shears tendon 22 by applying pressure to upper shear blade backup plate through shear compression cylinder 450, causing movable upper shear blade 420 and fixed lower shear blade 410 to cut tendon 22.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A table shear comprising:
   a clamp; and
   a shearing mechanism, the shearing mechanism supported by the clamp, the shearing mechanism including:
   a fixed lower shear blade;
   a lower shear blade backup plate supporting the fixed lower shear blade;
   a moveable upper shear blade supported by an upper shear blade backup plate;
   a shear compression cylinder, the shear compression cylinder having a cylinder busing directly abutting a surface of the upper shear blade backup plate;
   wherein the clamp includes:
   a bottom plate;
   a lower support block, the lower support block resting on the bottom plate;
   an upper spring hold down block, the upper spring hold down block positioned above the lower support block, the gap between the lower support block and upper spring hold down block defining a shear blade hole;
   a lower biasing mechanism, the lower biasing mechanism held in place by the bottom plate; and
   an upper biasing mechanism, the upper biasing mechanism held in place by an upper shear block
   wherein the table shear is configured such that applying pressure to the upper shear blade backup plate through the shear compression cylinder, causes the movable upper shear blade and fixed lower shear blade to cut a post tensioning tendon.

2. The table shear of claim 1, wherein the clamp further includes:
   a lower shear support block, the lower shear support block held in place by the lower biasing mechanism and wherein the upper spring hold down block is held in place by the upper biasing mechanism.

3. The table shear of claim 1, wherein the lower biasing mechanism, the upper biasing mechanism or both comprise a spring.

\* \* \* \* \*